United States Patent [19]

Epel

[11] Patent Number: 4,639,387

[45] Date of Patent: Jan. 27, 1987

[54] FIBROUS ARMOR MATERIAL

[75] Inventor: Joseph N. Epel, Southfield, Mich.

[73] Assignee: Budd Company, Troy, Mich.

[21] Appl. No.: 693,218

[22] Filed: Jan. 18, 1985

Related U.S. Application Data

[63] Continuation of Ser. No. 488,557, Apr. 25, 1983, abandoned.

[51] Int. Cl.$^4$ .............................................. B32B 27/00
[52] U.S. Cl. .................... 428/113; 428/294; 428/902; 428/911
[58] Field of Search ............... 428/113, 911, 240, 245, 428/246, 294, 902

[56] References Cited

U.S. PATENT DOCUMENTS

| | | | |
|---|---|---|---|
| 3,573,150 | 3/1971 | Broutman et al. | 428/911 |
| 3,722,355 | 3/1973 | King | 428/911 |
| 3,826,172 | 7/1974 | Dawson | 428/911 |
| 3,924,038 | 12/1975 | McArdle et al. | 428/911 |
| 4,200,677 | 4/1980 | Bottini et al. | 428/911 |
| 4,403,012 | 9/1983 | Harpell et al. | 428/911 |
| 4,404,889 | 9/1983 | Mignel | 428/911 |

FOREIGN PATENT DOCUMENTS 165428  10/1982  Japan .................... 428/113

*Primary Examiner*—Marion C. McCamish
*Attorney, Agent, or Firm*—Irvin L. Groh

[57] ABSTRACT

An improved armor material formed of resin bonded fiberous material. The fiberous material comprises at least one monofilament resin coated, wound and consolidated. Also disclosed is a method for making the armor.

8 Claims, 4 Drawing Figures

FIBROUS ARMOR MATERIAL

This is a continuation of co-pending application Ser. No. 488,557 filed on Apr. 25, 1983, now abandoned.

In one aspect this invention relates to materials suitable for use as an armor material.

In yet a further aspect this invention relates to a method of forming a projectile stopping armor material using resins and monofilament fibers.

Presently, protective helmets for use by military personnel are produced using a resin impregnated woven cloth. The impregnated woven cloth is cut into rectangular strips or other shapes which are then laid in a pattern with the edges of the strips overlapping to form a preformed structure. The preform is made by hand laying the strips on a mandrel. The hand forming operation and overlapping of the various strips of material makes formation of a uniform material difficult and the resulting finished product may have a marketedly variable impact resistance from location to location. Such variations in impact resistance and resulting weaknesses in the helmet are obviously undesirable.

Further, woven fiberous materials are expensive compared to an equal amount of monofilament fiber and impregnating the woven material with resin adds substantial additional cost. Thus, the resin impregnated woven material is an expensive raw material for use in making preformed shapes.

Cutting impregnated woven material into strips results in substantial waste of the material and further additional processing costs. The waste is even more pronounced where the impregnated woven material is cut into non-rectangular sections.

Briefly, this invention provides a method whereby a monofilament fiber is used in combination with a resin to make a preform suitable for further processing which includes curing the resin to a thermoset material. The method allows considerable flexibility with respect to the shape being preformed and because the monofilament material is evenly distributed throughout the finished product the result is a substantially uniform finished product.

In practicing the method of this invention, a monofilament fiber is coated with an uncured resin after which the coated fiber is fiber wound onto a mandrel in a plurality of layers. The filaments of each successive layer are disposed at an angle to the filaments of the preceding layer creating a large number of filament cross overs. The fibers are disposed on the mandrel in the shape of a desired preform and are coated with sufficient resin to bind and consolidate the fibers into a unitary body when the resin is cured. The resulting preform is placed into a mold and heat and pressure applied to consolidate the preform.

The new armor article formed by the process of this invention will result in an armor material having a large number of fiberous layers where each successive layer is disposed at an angle to the immediately preceding layer. The fibers are consolidated by a thermoset resin which in general will have an adhesive value to the fiber less than the tensile strength of the fiber. The resulting armor material will not have lines of weakness due to the presence of cut edges.

A further understanding may be had by reference to the accompanying drawing in which.

Figure 1:
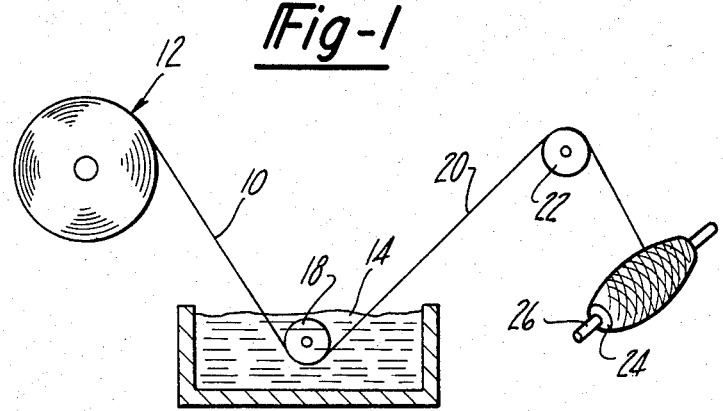
FIG. 1 is a schematic view of a process for coating a monofilament fiber and disposing it on a mandrel to make a preform.

Referring to the accompanying drawing wherein like reference numerals refer to like parts and initially to FIG. 1 a roll of monofilament fiber 10 to be coated is slowly unwound under tension from a spool 12 into a bath 14 of liquid resin contained within a reservoir 16. The monofilament fiber 10 passes under a tension roll 18 and is continuously drawn from the resinous material.

Figure 1A:
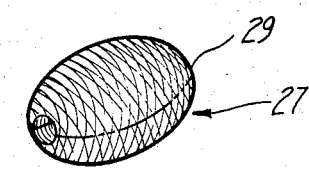
FIG. 1A is a schematic view showing the preform of FIG. 11 being severed prior to molding.

The coated fiber 20 coated with the resin passes over a roller 22 and onto a rotating mandrel 24 mounted on a spindle 26. The result is a shaped fiber bat 27 formed on the mandrel. As shown in FIG. 1A, the bat 27 of fibers is severed along a line 29 parallel to the longitudinal axis to form a pair of preforms 28 which can be placed in a die. The cut portions of the fibers are disposed at the edge of the helmet to provide continuous fibers across the top and sides of the helmet. Fiber winding is a known forming technique for distributing numerous layers of fibers on a mandrel to make a preform with a large number of layers. The fibers are wound tightly on the mandrel. The fibers will have a large number of cross over points where the fibers of one layer cross over the fibers of several preceding layers. The control means to achieve a uniformly distributed fiber mass is not shown but is within the skill of the fiber winding art. As shown, a helmet preform is being wound on an ovoid or egg shaped mandrel. When winding is completed, the preform can be transversely cut in half creating two cup-shaped preforms suitable for pressing to form a finished helmet.

Figure 2:
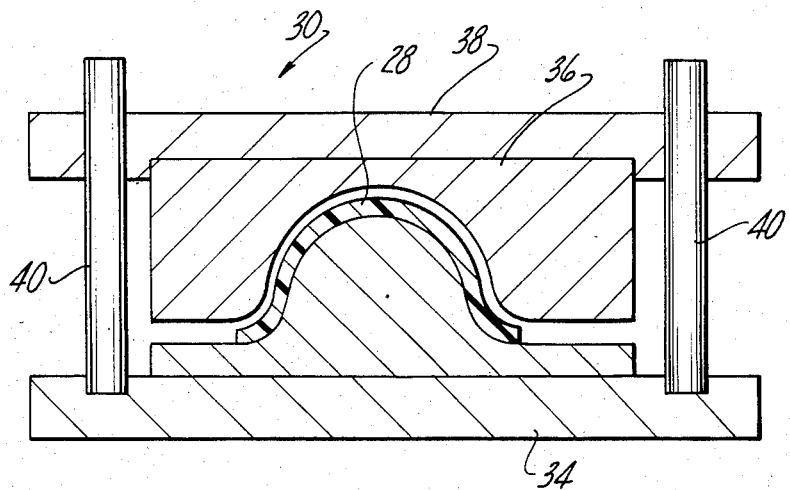
FIG. 2 is a schematic view of a die suitable for curing the preform.

As shown in FIG. 2, after the resin coated monofilament fiber 20 has been wound on the mandrel 24 and the preform cut to form two cups 28, the cups can be cured using a press 30. After the cup 28 is placed on a lower die member mounted on a lower mold base 34, a complimentary upper mold cavity 36, mounted on an upper mold base 38 disposed above the die 32, is moved into position to apply pressure in the range of 500–2000 lbs. per square inch to the preform. The mold bases 34, 38 move vertically along support rods 40 which are disposed in the mold bases using conventional techniques. The pressure can be applied using conventional hydraulic technology not shown as is common in molding and curing of fiber reinforced thermoset resins. Functionally stated, the amount of pressure applied by the molds 32, 35 to the preform 28 will be sufficient to compress and consolidate the fibers during the curing of the resin to a thermoset material.

The mold 32,34 has associated means for supplying heat to the preforms during pressing to cure the resin. Suitable heat sources include live steam, heated oil, radio frequency, or electrical resistance heaters. The amount of heat is generally controlled to cure the resin evenly in the shortest commercially acceptable time. The temperature at which the preform is cured will depend upon the resin being used to consolidate the fibers. The length of curing time is also variable based on the resin and the temperature. Determination of the desired curing temperature and time are within the skill of art and further discussion is omitted in the interest of brevity.

In general, the fibers useful in the practice of this invention will be monofilament fibers. As used here, the term monofilament fibers means fibers having a substantial length on the order of several feet up to and including several thousand feet. Such fibers are produced by various manufacturers using known fiber forming techniques. Such fibers are available in different diameters and formed of different materials.

One class of fibers useful in the practice of this invention are the polyamid fibers. One commercially available polyamid fiber is sold under the tradename "Kevlar", a polyamid monofilament which is available from the E. I. DuPont Company. Polyamid fibers provide excellent impact resistance in that the fibers have a tendency to absorb and dissipate the impact force along the longitudinal axis of the fiber when such fibers are not rigidly constrained and also from fiber bundle to fiber bundle at crossing points.

Glass monofilament fibers provide a second class of monofilaments which are useful in the practice of this invention. Glass fibers also possess impact resistance and are capable of forming a sound armor material when properly oriented and consolidated by means of a compatible thermosetting resin.

One advantage of the method of this invention is that successive layers can be formed using different fiberous materials. Using conventional production techniques, any changes in fiber type of the woven material would result in a substantial change in the properties of the structure at the point where the material being used changed from one type of fiber for example a polyamid to a second type of fiber such as glass. Using the techniques of this invention, a layer or layers of one fiber can be disposed on the mandrel and additional successive layers can be overlayed using a second fiber. Indeed, if desired, a number of fiberous layers can be disposed on the mandrel in order to provide a finished product which has the desired properties. For example, an extremely hard impact resistance material could be placed on the outer layer of the armor material to absorb a substantial portion of the shock as a projectile contacts the armor material with successive layers of more flexible material designed to further slow and absorb the impact of the projectile as it enters. Because the layers are placed successively, there is no discontinuity within each individual layer.

Prior to being wound on the mandrel, the monofilament material will be coated with a resinous material suitable for consolidating and maintaining the fibers in a resin matrix. The resin's function is to consolidate and hold the fibers firmly in a three-dimensional array of crossing layers. In general, the resin used in this invention will have an adhesive value with respect to the fibers less than the tensile strength of the fibers. That is, upon impact, the fibers will be free to transmit impact force along their longitudinal axis which requires that the resin not hold the fibers rigidly along the surface but allow some small amount of movement of the fibers surface longitudinally within the resin. Obviously, the resin should offer some resistance to the fiber motion so that structure resists and provides a limited fiber spread transversely to the fiber axis upon projectile impact.

One class of resins useful in the practice of this invention are polyester resins. Such unsaturated polyester resins have hydroxyl and carboxyl active groups contained within the resin and may have average molecular weights in the range of 800 to 5,000 or more. To the resinous material is added a minor amount of a free radical catalyst which will promote curing upon the application of heat to the liquid resin. Polyester resins useful in the practice of this invention can be of the glycolmaleate type resins. These resins are formed from maleic acid or anhydride along with the desired glycol in the presence of an esterification catalyst. Also glycolmaleate-phthalate type resins using glycol, maleic and hydride and phthalic or isophthalic acid with the glycol form another type of polyester resin useful in the practice of this invention. Such resins are produced using standard techniques and can be modified by the addition of other compatible resinous materials to form a resin having the desired properties.

A further type of a resin useful in the practice of this invention are the phenolics. Phenolic resins are inexpensive, provide a good consolidating resin, can be handled using conventional technology and do not bond too firmly to "Kevlar". Phenolics do require that moisture be driven from the resins to "B" stage the resin as one step in the process.

Vinyl ester resins provide a further class of preferred resins which are amenable to filament winding techniques without the requirement to "B" stage the resin.

A further class of resins which may be useful depending upon the use to which the armor is put are the well known urethane resins which are the reaction of product of isocyanate with a polyol. Such urethanes are well known in the art for their flexibility and resistance to degradation. The urethanes can be modified by the use of other known organic reaction products such as isocyanurate linkages in the resins, such isocyanurate also increases heat resistance providing a trimerized spacially configured resin at the molecular level which provides additional strength and rigidity to the urethane resin.

As shown in the drawing, the monofilament fiber is passed through a bath of liquid prior to being disposed upon the mandrel. Coating with liquid resins is a standard technique and such a coating technique ensures that the surface of the fiber will be fully and thoroughly coated with a liquid resin which will flow along the fiber resulting in a uniform coating. The coating techniques are well developed and it is possible to ensure that the fiber contains a substantially uniform thickness of liquid resin along its entire length as it is being disposed on the mandrel. It is also within the purview of this invention to coat the fiberous material with a solid thermosetting resin which can be cured to a consolidated uniform matrix upon the application of heat and pressure. One such technique would be to heat the fiber and pass it into a fluidized bed of solidified B-stage thermosetting material, the heated monofilament containing sufficient heat to melt a minor portion of the thermosetting resin particles which would adhere to the monofilament and thereby be carried onto the mandrel. Such coating techniques using fluidized beds are also known in the art. Upon the application of additional heat, the B-stage resin will liquefy sufficiently to fill in any adjacent intersticial voids resulting in a uniform resin matrix holding the monofilament in position.

A further solid resin coating technique is to apply a small amount of a pressure sensitive adhesive to the monofilament fiber prior to passing the monofilament through a solidified thermosetting resin. The pressure sensitive adhesive will retain the solid particles of resin on the surface of the monofilament. The monofilaments coated according to this procedure will be essentially dry and are easily handled. The monofilaments coated according to this procedure could be coated and rewound on a spool for use at a later time since the coating of solid thermosetting resin provides a dry easily handled fiber which can be stored in spool form and used at a later date. Because the thermosetting resins do not react until the application of heat and pressure substantially above normal ambient pressures and temperatures, the monofilament remains an unconsolidated fiber until such time as it is cured.

As stated hereinbefore, the resin of this material is designed to hold the successive layers of the fiberous material in a spacial relationship with successive layers of material having the axis of the fibers disposed at an angle ranging from 30 to approximately 90 degrees such laminated materials possessing substantial resistance to tearing upon impact of a projectile. Since a laminate of this construction and of this invention is designed to dissipate the impact energy along the length of the fibers and from fiber bundle to fiber bundle by certain movement longitudinally of the fiber it is desired to maintain the resin at the minimum level necessary to maintain the fibers in the proper relationship and consolidation. The amount of resin present will be the amount necessary to consolidate the fibers which comprise 50-85 percent by volume of the armor. The amounts of resin should be sufficient to hold the fibers in a firm spacial configuration but being less than that required to bind the fibers rigidly. If the amount of resin is substantially increased above the desired amount the resin matrix will become a major part of the armor volume weakening the materials. Resin amounts substantially less than that specified will result in the material wherein the fibers are not properly consolidated and held in the spacial relationship so that upon impact the fibers will tend to separate allowing the projectile to pass through before the fibers absorb the maximum amount of force they can withstand from the projectile along their longitudinal axes.

Where desired, it is possible to apply a sizing or other coating to the fibers prior to treating with the resinous material to ensure that the adhesion between the fiber and the resin has the desired value in order to ensure that there will be sufficient movement of the fiber within the resin matrix during impact by a projectile.

In forming the object of forming the layers by means of monofilament fibers is to provide layers of minimal thickness and maximize the number of cross over points between the axes of the fibers which form the various layers. The cross overs will be at various angles and successive layers will form a three dimensional array.

The foregoing detailed description with respect to producing the preform was directed to a shaped, three dimensional object such as the well known infantry helmet. However, there is a substantial need for a light weight armor material in sheet form. Such sheets could be used in vehicles, ships or on portable equipment to protect the sophisticated electronic gear becoming more common in such applications.

Figure 3:
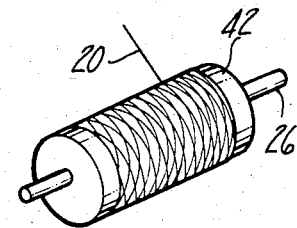
FIG. 3 is a schematic view of a mandrel for winding a cylinder of fibrous material.

A flat sheet of material can be formed by the fiber winding techniques discussed hereinbefore by applying the fibers to a cylinder as shown in FIG. 3. The resin coated fiber 20 is wound on a cylindrical mandrel 42 to form a sleeve of fibers 44 which have a substantial number of cross over points. In using fiber winding techniques the fibers which are wound on the mandrel during a given pass will be spaced apart. Successive layers will fill in the gaps and create additional cross over points. The fibers of each succeeding layer will create cross over points with the layers of more than one preceding layer giving the wound preform a three dimensional array of cross over points at different angles. After the fibers have been tightly wound on the cylinder the resulting sleeve can be removed from the drum as a cylindrical mat of fibrous material. The fibrous cylinder can either be pressed between flat platens into a flat sheet or the cylinder can be cut longitudinally and opened to form a larger flat sheet. The sheet will then be subjected to heat and pressure to form a consolidated sheet of armor plate. Obviously, it would be possible to form the sheet between shaped platens during molding to provide a slightly curved surfaces. Such forming should not substantially alter the fiber's orientation or cause the fiber to move into closely aligned bundles. The fibers should, where possible, be spaced so there are not a plurality of fibers laying axially aligned and close together in the same layer.

The flat sheet resulting from the practice of this invention will provide light weight armor which can be used in mobile applications but still give a high degree of protection against particle penetration. Possible applications include protection for land based vehicles, naval ships, and electronic gear.

Various modifications and alterations of this invention will become apparent to those skilled in the art from the description set forth herein and it is understood that this invention is not limited to the illustrative embodiments set forth hereinbefore.

What is claimed is:

1. An armor material suitable for resisting substantial impacts comprising: a plurality of monofilament fibers disposed within said material, said fibers being disposed in successive alternating and separate layers, the fiber axis in any given layer being substantially parallel to each other to form a thin layer having a thickness equal to the diameter of the fibers, the fiber axes in layers adjoining said given layer being disposed substantially parallel to each other and at angles to the fiber axis in said given layer to form a multiplicity of cross over points; a resinous material surrounding and consolidating said fibers into a three-dimensional structure to form a resin matrix, said resinous material having adhesion to said fibers less than the cohesive strength of said fibers to afford movement of the fibers relative to said matrix upon application of impact force to said armor material whereby a substantial amount of the impact force will be absorbed longitudinally along the axes of the fibers.

2. The armor material of claim 1 wherein said monofilament fiber is polyamid.

3. The armor material of claim 1 wherein said monofilament fibers is glass.

4. The armor material of claim 1 wherein said resin matrix is a thermoset polyester material.

5. The armor material of claim 1 wherein alternate layers of monofilament fiber are of different materials.

6. The material of claim 1 wherein said alternate layers of said material are polyamid and fiberglass.

7. The armor material of claim 1 wherein said fiberous material comprises about 50 to 80 percent by volume of the total material.

8. An armor material suitable for resisting substantial impacts comprising: at least one monofilament fiber disposed within said material, said monofilament fiber being enclosed along its entire length with a coating of resinous material, said fiber being placed into a series of layers formed by passing the fiber upon itself in ascending layers, with successive layers being held in mutually spacial relationship with respect to all other layers by the resinous coating on said monofilament fiber, the fiber axes of adjoining layers being disposed at an angle with respect to each other to form a multiplicity of cross over points; said resinous material having an adhesive value with respect to said monofilament fiber less than the tensile strength of the fiber whereby the fiber is free to transmit impact along its longitudinal axis within the resin, said resin offering a resistance to motion of said monofilament fiber transversely of said axis of said fiber whereby movement of said fiber transversely of its axis if restricted and a substantial amount of any impact force will be absorbed longitudinally along said monofilament fiber.

* * * * *